United States Patent [19]

Radcliffe et al.

[11] 4,337,647
[45] Jul. 6, 1982

[54] ENGINE ROUGHNESS SENSOR

[75] Inventors: Charles R. Radcliffe, Fraser; James A. Davis, Bloomfield Hills, both of Mich.

[73] Assignee: The Bendix Corporation, Southfield, Mich.

[21] Appl. No.: 101,396

[22] Filed: Dec. 7, 1979

[51] Int. Cl.³ .......................................... G01M 15/00
[52] U.S. Cl. .......................................... 73/116; 73/660
[58] Field of Search ...................... 73/116, 660, 117.3; 364/551

[56] References Cited

U.S. PATENT DOCUMENTS

| | | | |
|---|---|---|---|
| 3,789,816 | 2/1974 | Taplin et al. | 123/119 R |
| 3,815,561 | 6/1974 | Seitz | 123/119 R |
| 3,897,766 | 8/1975 | Pratt, Jr. et al. | 123/146.5 A |
| 3,957,023 | 5/1976 | Peterson | 123/117 R |
| 3,977,373 | 8/1976 | Sand | 123/117 A |
| 4,002,155 | 1/1977 | Harned et al. | 123/148 E |
| 4,015,566 | 4/1977 | Wahl | 123/117 R |
| 4,015,572 | 4/1977 | Leshner et al. | 123/139 AW |
| 4,016,753 | 4/1977 | Willenbecher et al. | 73/116 |
| 4,026,251 | 5/1977 | Schweitzer et al. | 123/32 EA |
| 4,044,234 | 8/1977 | Frobenius et al. | 235/150.21 |
| 4,044,235 | 8/1977 | Frobenius | 235/150.21 |
| 4,044,236 | 8/1977 | Bianchi et al. | 235/150.21 |
| 4,179,922 | 12/1979 | Bouverie et al. | 73/116 |

Primary Examiner—Jerry W. Myracle
Attorney, Agent, or Firm—Gaylord P. Haas, Jr.; Russel C. Wells

[57] ABSTRACT

An engine roughness sensor for generating speed normalized digital roughness signals indicative of the variations in magnitude between successive torque impulses imparted to the engine's crankshaft by measuring the period or time it takes the crankshaft to rotate through the same angle for each torque impulse is disclosed herein. The digital roughness signal is normalized as a function of engine speed by dividing the measured magnitude of each torque impulse by a signal indicative of the engine speed to reduce the magnitude of operator induced variations in the generated roughness signals. The disclosed engine roughness sensor generates a second difference roughness signal which is the difference between the sequentially generated roughness signals.

22 Claims, 4 Drawing Figures

ENGINE ROUGHNESS SENSOR

CROSS REFERENCE

The disclosed invention is related to the commonly-assigned co-pending application Ser. Nos. 904,129; 904,131; 904,132; 904,137; 904,138; and 904,139 filed May 8, 1978, Ser. No. 904,129 having issued as U.S. Pat. No. 4,197,767, granted on Apr. 15, 1980, the disclosures of which are incorporated herein by reference.

FIELD OF THE INVENTION

The invention is related to engine roughness sensors, and in particular to an engine roughness sensor detecting the instantaneous rotational velocity of the engine's crankshaft and generating an average roughness signal.

BACKGROUND

Electronic ignition and fuel control systems for internal combustion engines are finding acceptance in the automotive and allied industries as rigid efficiency and pollution standards are imposed by the government. The first generation of these electronic controls were open loop systems which became progressively complex as the standards were raised. The number of variables needed to be detected as well as auxiliary circuits for providing corrections for these variables increased with each raising of the standards. From the conception of electronic control systems for internal combustion engines, it has been known that if the control systems could be closed about the engine, simpler control systems could be developed. This would reduce the number of variables needed to be detected, reduce the complexity of the control systems, and at the same time improve the overall efficiency. The problem that has plagued the industry is the selection of an appropriate engine parameter about which to close the loop.

K. W. Randall and J. D. Powell from Stanford University in their research under a Department of Transportation sponsored project determined that for maximum efficiency of an internal combustion engine, the spark timing should be adjusted to provide a maximum cylinder pressure at a crankshaft angle 15 degrees past the piston's top dead center position. The results of this investigation are published in a Final Report NO SU-DAAR-503 entitled "Closed Loop Control of Internal Combustion Engine Efficiency and Exhaust Emission". The report contains a block diagram of a closed loop system in which a sensor detects the angle at which peak pressure occurs then compares this measured angle with the desired 15° angle. An error signal, generated when the measured angle differs from the desired angle, is used to correct the ignition timing signal generated in response to the other sensed engine parameters.

Comparable closed loop ignition control systems closed about the cylinder pressure are disclosed by M. M. Peterson in U.S. Pat. No. 3,957,023 entitled "Pressure Responsive Engine Ignition System" issued May 19, 1976 and Sand in U.S. Pat. No. 3,977,373 "Closed Loop Combustion Pressure Control" issued Aug. 31, 1976.

An alternate closed loop ignition control system taught by Pratt, Jr. et al. in U.S. Pat. No. 3,897,766 entitled "Apparatus Adapted to Opto-Electrically Monitor the Output of a Prime Mover to Provide Signals which are Fed Back to the Input and Thereby Provide Control of the Prime Mover" issued Aug. 5, 1975 embodies a torque sensor which measures the twist in the output shaft of the prime mover to measure the torque. The measured torque and engine speed are used to close the loop about the engine.

Harned, et al. in U.S. Pat. No. 4,002,155 entitled "Engine and Engine Spark Timing Control with Knock Limiting, etc." issued Jan. 11, 1977 teaches a closed loop ignition system in which engine knock-induced vibrations are detected by an engine mounted accelerometer. The system counts the number of individual ringing vibrations that occur in a predetermined angular rotation of the crankshaft. When the number of ringing vibrations exceed a predetermined number, the engine spark timing is retarded and when the number of ring vibrations is less than a second predetermined number, the spark timing is advanced.

Wahl in U.S. Pat. No. 4,015,566 entitled "Electronic Ignition Control System for Internal Combustion Engines" issued Apr. 5, 1977 teaches a closed loop ignition timing system closed about an operational parameter of the engine. In his patent, Wahl teaches sensing the temperature of a catalytic converter, the exhaust gas composition (especially NO compounds), or in the alternative using vibration sensor to detect a rough running engine. The use of engine roughness as the measured parameter is similar to the system taught by Harned in U.S. Pat. No. 4,002,155 discussed above. In still another type of closed loop system, Schweitzer, et al. in U.S. Pat. No. 4,026,251 entitled "Adaptive Control System for Power Producing Machines" issued May 31, 1977 teaches dithering the ignition timing and closing the loop about the engine's speed.

The closed loop ignition timing systems in which the cylinder pressure is measured directly as taught by Randall and Powell and implemented in the patents to Peterson and Sand appear as the most direct and effective engine parameter about which to close the loop. However, this method requires a pressure transducer to be incorporated into at least one of the engine's cylinders where it is exposed to high temperatures and high pressures. Such pressure sensors are costly, have relatively short life expectancies and require additional modification to the engine for their use. Alternatively, pressure sensors adapted to be used in conjunction with the spark plugs are known but still suffer from the first listed deficiencies. The direct measurement of engine torque as taught by Pratt, Jr., et al. is an alternative approach but requires a relatively complex and expensive torque measuring sensor. The measurement of the onset of engine work or roughness as taught by Harned, et al. and Wahl respectively are believed to be too inaccurate to meet today's standards while the system taught by Schweitzer is believed to be ineffective because factors other than ignition timing such as a change in load could affect the engine speed and result in improper ignition timing.

Various types of closed loop fuel control systems for internal combustion engines have been developed in which the loop is closed about the different engine parameters. The one of the parameters about which the loop is closed is the composition of the exhaust gas as taught by Seitz in U.S. Pat. No. 3,815,561 "Closed Loop Engine Control System" issued June 11, 1974 as well as many others. The system taught by Seitz uses an oxygen ($O_2$) sensor detecting the concentration of oxygen in the exhaust gas and closes the loop about a stoichiometric mixture of air and fuel. However, a stoichiometric mixture of air and fuel has been found to be too rich for the efficient operation of the engine. Various techniques have been employed to operate the engine at leaner air fuel ratios but the ability to achieve reliable closed loop control at the desired leaner mixture is limited by the characteristics of the present day oxygen sensors.

An alternate approach is taught by Taplin, et al. in U.S. Pat. No. 3,789,816 "Lean Limit Internal Combustion Engine Roughness Control System" issued Feb. 5, 1974 in which engine roughness is detected as the parameter about which the loop is closed. In this system, the air/fuel mixture is leaned out until a predetermined level of engine roughness is achieved. The magnitude of engine roughness is selected to correspond with a level of engine roughness at which the air fuel mixture is made as lean as possible to the point that the formation of such exhaust gas as HC and CO is minimized without the driveability of the particular vehicle being unacceptable. Engine roughness as measured in the Taplin, et al. patent is the incremental change in the rotational velocity of the engine's output as a result of the individual torque impulses received from each of the engine's cylinders. The closing of the fuel control loop about engine roughness appears to be the most effective means for maximizing the fuel efficiency of the engine.

Leshner, et al. in U.S. Pat. No. 4,015,572 teaches a similar type of fuel control system in which the loop is closed about engine power. In their preferred embodiment, Leshner, et al. use exhaust back pressure as a manifestation of engine power, however, state that a measured torque, cylinder pressure, of a time integral of overall combustion pressure for one or more engine revolutions at a given RPM may be used in the alternative. In a more recent advertising brochure "Breaking the Lean Limit Barrier", Fuel Injection Development Corporation of Bellmawr, N.J., the assignee of the Leshner, et al. patent states that the parameter measured is the velocity of the engine's flywheel.

In another type of fuel control system using engine roughness as the sensed parameter to close the loop, Bianchi, et al. in U.S. Pat. No. 4,044,236 teaches measuring the rotational periods of the crankshaft between two sequential revolutions of the engine. The differential is digitally measured in an up-down counter counting at a frequency proportional to the engine speed.

In an alternate type of roughness closed loop fuel control system, Frobenius, et al. in U.S. Pat. No. 4,044,234 "Process and Apparatus for Controlling Engine Operation Near the Lean-Running Limit" issued August, 1977 teaches measuring the rotational period of two equal angular intervals, one before and one after the top dead center position of each piston. The change in the difference between the two rotational periods for the same cylinder is compared against a particular reference value and an error signal is generated when the change exceeds the reference value. Frobenius in U.S. Pat. No. 4,044,235 "Method and Apparatus For Determining Smooth Running Operation in an Internal Combustion Engine" issued August, 1977 teaches an alternate roughness control system wherein the periods of three sequential revolutions are compared to determine engine smoothness. The above reflects various ways in which engine roughness as detected by various means including the variations in the rotational velocity of the flywheel is used to close the loop about the engine.

The prior art teaches independent closed loop control systems, in which each control, i.e., ignition timing, fuel control, and fuel distribution are treated as separate entities. The applicants herein teach an integrated engine control system in which the control loops for each controlled parameter is closed about a single measured engine operating parameter and in particular, the instantaneous rotational velocity of the engine's crankshaft. The data obtained from the singularly measured parameter is processed in different ways to generate timing and fuel delivery correction signals optimizing the conversion of combustion energy to rotational torque by the engine.

SUMMARY OF THE INVENTION

The invention is an engine roughness sensor for generating a speed normalized roughness signal. The sensor comprises a reference signal generator generating reference signals indicative of two different angular increments of crankshaft rotation for each torque impulse generated by the combustion of an air/fuel mixture in the individual cylinders of the engine. The two angular increments are selected such that the period or time it takes the crankshaft to rotate through the first angular increment is indicative of the engine speed while the time it takes the crankshaft to rotate through the second angular increment is indicative of the magnitude of the torque impulse.

A variable frequency oscillator generates a signal having a pulse frequency inversely proportional to the period of the first angular increment. An up counter enabled during each second angular increment counts the pulses generated by the variable frequency oscillator and generates a signal having a value directly proportional to the magnitude of the torque impulse as determined by the period of the second angular increment and inversely proportional to the engine speed as determined by the period of the first angular increment. At the end of the second angular increment, the content of the up counter is transferred to a down counter and the up counter is cleared. During the first angular increment of the next sequential torque impulse, the variable frequency oscillator generates a pulse signal at a frequency inversely proportional to the period of the first angular increment of the sequential torque impulse and in the second angular increment the up and down counters are enabled. The up counter again counts up at a rate determined by the signal generated by the variable frequency oscillator and the down counter is counted down by the signals generated by the variable frequency oscillator.

The engine roughness signal generated at the end of the first sequential torque impulse is temporarily stored and is subtracted from the engine roughness signal generated at the end of a second sequential torque impulse to generate a second difference roughness signal indicative of the difference between two sequentially generated roughness signals.

This application is one of a family of patent applications all commonly assigned and having substantially the same specification and drawings, the applications being identified below:

| Serial Number | Filing Date | Title |
| --- | --- | --- |
| 904,129 | 05/08/78 | Warm Up Control For Closed Loop Engine Roughness Fuel Control |
| 904,131 | 05/08/78 | Closed Loop Timing and Fuel Distribution Control |
| 904,132 | 05/08/78 | Digital Roughness Sensor |
| 904,137 | 05/08/78 | Timing Optimization Control |
| 904,138 | 05/08/78 | Integrated Closed Loop Engine Control |

-continued

| Serial Number | Filing Date | Title |
| --- | --- | --- |
| 904,139 | 05/08/78 | Closed Loop Engine Roughness Control |
| 101,396 | 12/07/79 | Engine Roughness Sensor |

Application Ser. No. 904,129, now U.S. Pat. No. 4,197,767, issued Apr. 15, 1980, has been printed in its entirety and the specification of that application is specifically incorporated herein by reference.

Figure 33:
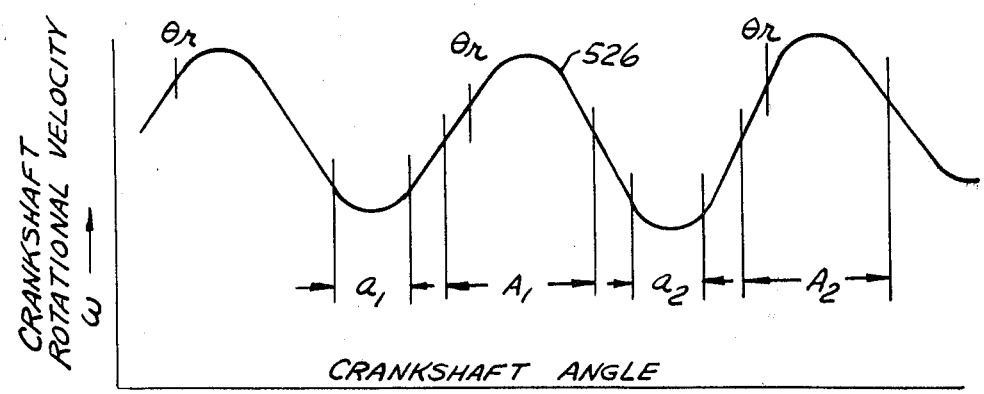
FIG. 33 is a waveform used in the description of the Roughness Sensor.
Figure 32:
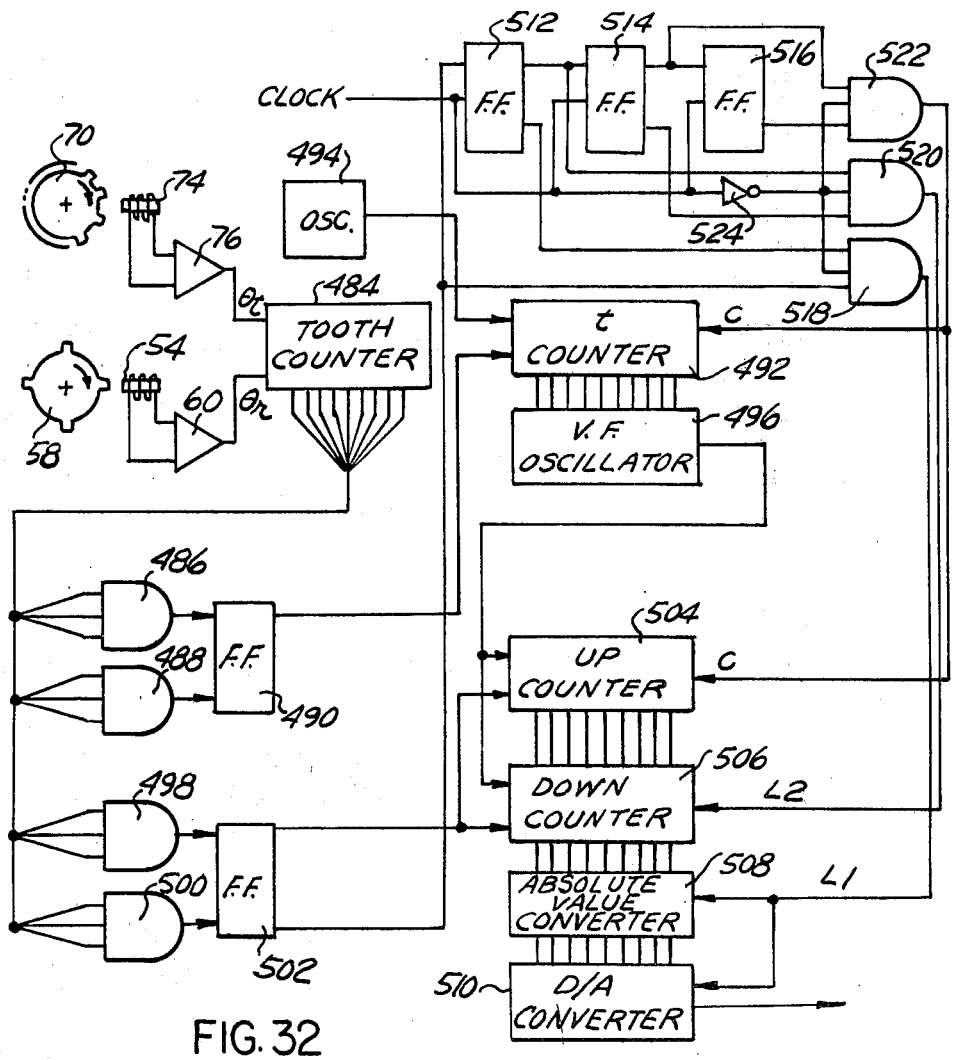
FIG. 32 is a circuit diagram of the Roughness Sensor.
Figure 34:
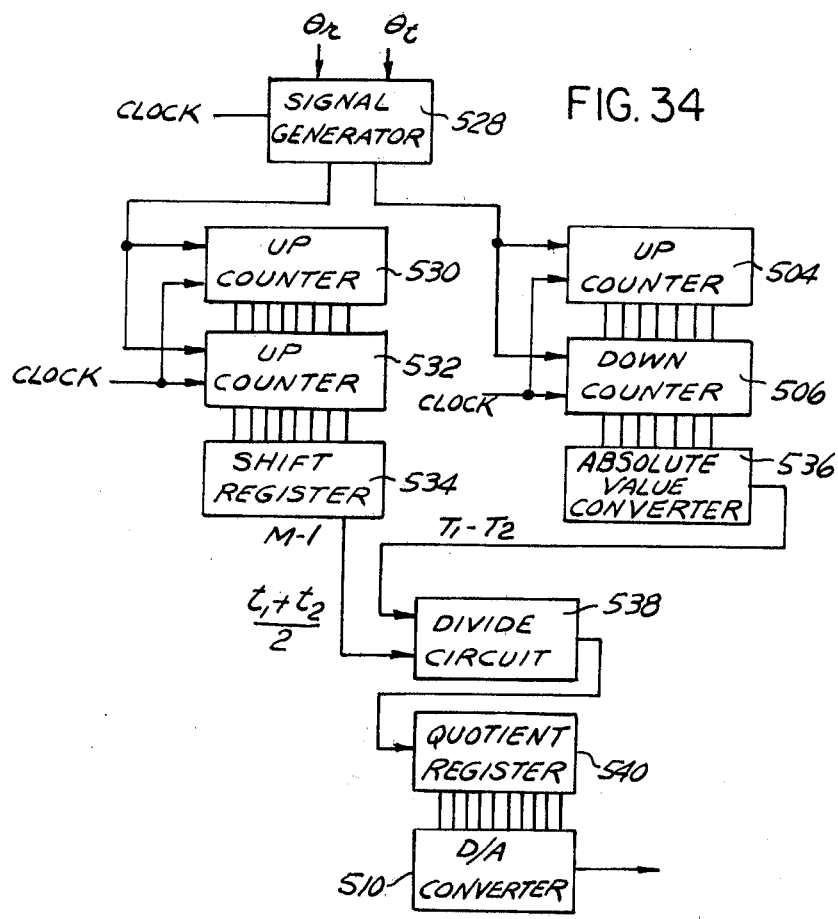
FIG. 34 is a circuit diagram of an alternate embodiment of the Roughness Sensor.
Figure 35:
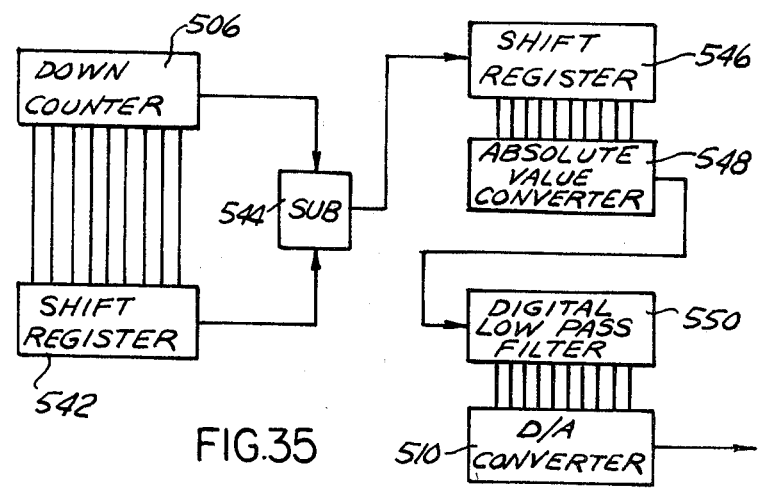
FIG. 35 is a circuit diagram of an addition to the Roughness Sensor shown in FIGS. 32 and 34 for generating a second difference roughness signal.

What is claimed is:

1. A roughness sensor for generating roughness signals indicative of the variation in the magnitude of the torque impulses imparted to a rotating element, the sensor comprising:
    means detecting the rotational position of the rotating element for generating first interval signals indicative of a first angular interval of the rotating element's rotation for each torque impulse, and for generating second interval signals indicative of a subsequent angular interval of the rotating element's rotation, wherein the rotating member has a maximum rotational velocity in response to each torque impulse in said subsequent angular interval;
    means response to said first and second interval signals for generating a normalized signal having a value proportional to the magnitude of the torque impulse determined by the time required by the rotating element to rotate through said subsequent angular interval and inversely proportional to engine speed determined by the time required for the rotating element to rotate through said first angular interval;
    means for generating a roughness signal from at least two sequentially generated normalized signals, said roughness signal having a value equal to the difference between said sequentially generated normalized signals; and
    means responsive to more than one roughness signal for generating an average roughness signal having a value indicative of the average of at least two previously generated said roughness signals.

2. The sensor of claim 1 further including means for converting said average roughness signal into an analog signal having a value proportional to said average roughness signal.

3. The sensor of claim 1 wherein said means for detecting comprises:
    angle encoder means connected to the rotating element for generating angle increment signals dividing a revolution of said rotating element into a plurality of small equal angular increments;
    means coupled to the rotating element for generating reference signals at predetermined angular positions of the rotating element with respect to each torque impulse;
    first counter means, reset by said reference signal for counting and storing a number indicative of the number of angle increment signals generated after the occurrence of said reference signal; and
    decoder means responsive to the number stored in said first counter for generating said first and second interval signals, wherein said first interval signal is generated when the number is between two first predetermined numbers and said second interval signal is generated when the number is between two second predetermined numbers.

4. The sensor of claim 3 wherein a ring gear having a plurality of teeth disposed at equal angular increments is coupled to the rotating element, said encoder is a sensor detecting the passing of each tooth on the ring gear as the rotating element rotates, for generating said angle increment signals.

5. The sensor of claim 3 wherein said decoder means comprises:
    an oscillator generating first oscillator signals at a predetermined rate;
    second counter means counting and storing said first oscillator signals in response to said first interval signal to generate a number indicative of the time required by the movable element to rotate through said first angular interval;
    variable frequency oscillator means for generating a second oscillator signal having a frequency inversely proportional to the number stored in said second counter means; and
    up counter means for counting and storing a number indicative of the number of said second oscillator signals received during said second interval signal wherein the number stored in said up counter is said normalized signal.

6. The sensor of claim 5 wherein said means for generating a roughness signal comprises:
    down counter means receiving the number stored in said up counter means generated during a preceding second interval signal and counting said second oscillator signals generated in response to a subsequently received second interval signal for generating at the end of the second interval signal a number indicative of the roughness signal.

7. The sensor of claim 6 further including means for converting the number generated in the down counter at the end of the second period signal to an absolute value.

8. The sensor of claim 7 further including means for converting the absolute value of the number generated in the down counter at the end of each second period signal to an analog signal.

9. A method of generating roughness signals indicative of the variation in the magnitude of the torque impulses imparted to a movable element, the method comprising:
    detecting the rotational position of the movable element, for generating first interval signals indicative of first angular interval of the movable element's rotation for each torque impulse, and generating second interval signals indicative of a subsequent angular interval of the movable element's rotations, wherein the movable element has a maximum rotational velocity in response to each torque impulse in said subsequent angular interval;
    generating a signal in response to said first and second interval signals having a value proportional to the magnitude of the torque impulse determined by the time required by the movable element to rotate through said subsequent angular interval;

generating a roughness signal from at least two sequentially generated signals, said roughness signal having a value equal to the difference between said sequentially generated signals; and then generating an average roughness signal having a value indicative of the average of at least two previously generated said roughness signals.

10. The method of claim 9 further including converting said average roughness signal into an analog signal having a value proportional to said average roughness signal.

11. The method of claim 9 further including the steps of:

generating angle increment signals dividing a revolution of said movable element into a plurality of small equal angular increments;

generating reference signals at predetermined angular positions of the movable element with respect to each torque impulse;

counting and storing a number indicative of the number of angle increment signals generated after the occurrence of said reference signal; and generating said first and second interval signals, wherein said first interval signal is generated when the number is between two first predetermined numbers and said second interval signal is generated when the number is between two second predetermined numbers.

12. The method of claim 11 further including the steps of:

generating first oscillator signals at a predetermined rate;

counting and storing said first oscillator signals in response to said first interval signal to generate a number indicative of the time required by the movable element to rotate through said first angular interval;

generating a second oscillator signal having a frequency inversely proportional to the number stored in said second counter means; and counting and storing a number indicative of the number of said second oscillator signals received during said second interval signal wherein the number stored in said up counter is said normalized signal.

13. The method of claim 12 further including the step of:

receiving the number stored in said up counter means generated during a preceding second interval signal and counting said second oscillator signals generated in response to a subsequently received second interval signal a number indicative of the roughness signal.

14. The method of claim 13 further including the step of converting the number generated in the down counter at the end of the second period signal to an absolute value.

15. The method of claim 14 further including the step of converting the absolute value of the number generated in the down counter at the end of each second period signal to an analog signal.

16. The method of claim 13 further including the steps of:

receiving the number stored in said up counter means generated during a preceding second interval signal and counting said second oscillator signals generated in response to a subsequently received second interval signal for generating at the end of the second interval signal a number indicative of the roughness signal; and averaging at least two sequentially generated roughness signals to generate an average roughness signal.

17. The method of claim 16 further including the step of converting said average roughness number to an analog signal.

18. A method of converting the instantaneous rotational velocity of the rotating member receiving torque impulses varying rotational velocity of said rotating member into roughness signals indicative of the variations in the individual torque impulses comprising the steps of:

detecting predetermined angular positions of the rotating member to generate first interval signals indicative of a first angular interval of the rotating member for each torque impulse, and to generate second interval signals indicative of second angular intervals of the rotating member for each torque impulse in which the rotating member has a maximum change in rotational velocity in response to the associated torque impulse;

measuring for each torque impulse the time duration of said first interval signals to generate a signal indicative of the rotational velocity of the rotating member and the time duration of said second interval signal to generate a signal indicative of the magnitude of the torque impulse; and combining from the signal indicative of the rotational velocity of the rotating member and the magnitude of two torque impulses to generate a roughness signal having a value directly proportional to the difference between said two torque impulses and inversely proportional to the rotational velocity of the rotating member, said step of generating a roughness signal including the steps of:

generating oscillator signals having a predetermined frequency;

counting and storing said oscillator signals during the occurrence of each first interval signal to generate a third number indicative of the rotational velocity of the rotating element in said first angular interval;

counting and storing said oscillator signals generated during the occurrence of the next sequential first interval signal to generate a sum signal indicative of the rotational velocity of said rotating element in two sequential first angular intervals;

dividing said sum signal by two to generate an average number indicative of the average rotational velocity of the output shaft;

counting up and storing in an up counter the oscillator signals during the occurrence of each second interval signal to generate a first impulse magnitude number indicative of the magnitude of each torque impulse;

transferring said first roughness number to a down counter at the end of each second interval signal;

counting down said first impulse magnitude number transferred to said down counter with said oscillator signals during the occurrence of each next sequentially generated second interval signal to generate an impulse magnitude difference number indicative of said roughness signal; and dividing said impulse magnitude difference number by said average number to generate said roughness signal.

19. The method of claim 18 further including the steps of subtracting two sequentially generated roughness signals one from the other to generate a second difference roughness signal having a value indicative of the difference between two sequentially generated roughness signals.

20. The method of claim 19 further including the step of converting said second difference roughness signal to an absolute value.

21. The method of claim 20 further including the step of averaging at least two sequentially generated second difference roughness signals to generate an average second difference roughness signal.

22. The method of claim 21 further including the step of converting said average second difference roughness signals to an analog signal.

* * * * *